Sept. 24, 1957     D. CURRIE     2,807,378
DIRECTIONAL DEFLECTOR FOR A CORN PICKER ELEVATOR
Filed March 25, 1955
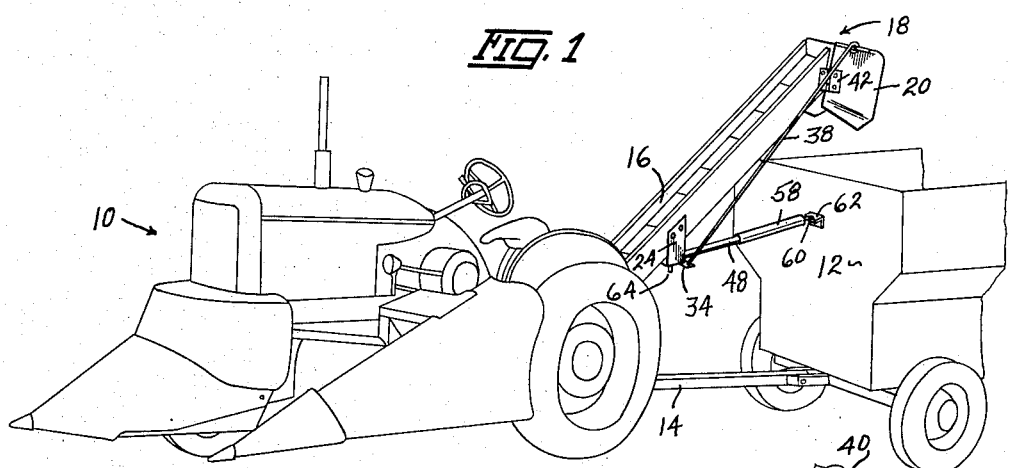
INVENTOR.
DUGALD CURRIE
BY Talbert Dick & Adler
ATTORNEYS.

United States Patent Office 2,807,378
Patented Sept. 24, 1957

2,807,378

DIRECTIONAL DEFLECTOR FOR A CORN PICKER ELEVATOR

Dugald Currie, Carroll, Iowa

Application March 25, 1955, Serial No. 496,823

4 Claims. (Cl. 214—42)

My invention relates to a means for directing the flow of corn in different directions as it leaves the elevator of a corn picking machine.

One of the problems in using a mechanical corn picker on contour rows, for example, arises from the fact that as the picker moves along a curved path the discharge end of the elevator does not remain in alignment with the wagon which is being pulled and into which the picked corn is deposited. In other words, as the direction of movement of the picker changes, the discharge end of the elevator will for a short period of time discharge the corn outside of the confines of the wagon until the wagon itself has negotiated the turn sufficiently to again line up with the elevator. Consequently, if the elevator is not disengaged during the turn, a good deal of corn falls to the ground, and if it is disengaged for each turn, a good deal of lost time and inconvenience results.

It is, therefore, one of the important objects of my invention to provide novel means associated with the discharge the end of the elevator on a corn picking mechanism to direct the flow of corn therefrom in different directions.

Another object of this invention is to provide a device of the above class associated with the combination of a corn picking machine and a wagon pulled thereby wherein the means on the elevator for changing the direction of flow of corn is actuated by the movement of the wagon as it changes its relative position in line of travel with the corn picker.

A still further object of this invention is to provide a device as described which is adapted for easy attachment to corn picker elevators of different sizes.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of a corn picking machine and wagon attached thereto an illustrating a preferred embodiment of my invention associated therewith, Fig. 2 is an enlarged side elevational view of the corn picker elevator and a fragmentary portion of the wagon and showing my directional control means in their operational relationship thereto, Fig. 3 is an enlarged perspective view of the bracket mounting for this invention and the parts associated therewith, and Fig. 4 is a bottom view of this invention to more clearly illustrate the movements of the directional deflectors.

Referring to the drawings a corn picking machine is shown generally at 10 (Fig. 1) with a wagon 12 attached thereto in the usual manner by the tongue 14. The elevator 16 extends upwardly and rearwardly from the picker 10 so that the discharge end 18 is suspended over the interior of the wagon 12 for depositing the picked corn therein. No invention is of course claimed in such arrangement and it is merely illustrated for a better appreciation of the use and purpose of my invention. It will be understood the elevator 16 is in a fixed position relative to the picker and the discharge end 18 will of course be moved laterally as the direction of movement of the picker changes. Such direction changes will for a time therefore move end 18 laterally with respect to wagon 12 and depending upon the degree of turn will at times leave end 18 suspended over the ground or edge of the wagon box. When this occurs it is obvious some or all of the corn may not fall into the wagon and it is in overcoming this problem that my invention has utility. In general I accomplish this by the use of a rudder-like directional deflector 20 hingedly secured to each side of the end 18 as an extension thereof and I have provided control means to turn these deflectors simultaneously in the same direction to direct the flow of corn laterally relative to the longitudinal axis of the elevator in a manner which I shall now describe in detail.

A pair of brackets 22 (Fig. 3) which are L-shaped to have the upstanding arm 24 and horizontal plate portion 26 are oppositely disposed relative to each other so that portions 26 are in overlapping sliding arrangement. Portions 26 are provided with registering slots 28 that extend between arms 24, and portions 26 are held in slidable relationship through slots 28 by any suitable means such as the nut and bolt 30. Thus it will be appreciated that the width between arms 24 can be adjusted to fit the width of a particular elevator 16 so that one arm 24 can be secured by a screw, bolt or the like 32 to each side of the elevator 16, as shown, at a point intermediate its ends. In attaching brackets 22 as described, it is pointed out that bracket plate portions 26 are disposed on a horizontal plane as shown in Fig. 2.

A control bar 34 is pivotally secured at its longitudinal center to the bolt 30 at the underside of bracket portions 26 and has a length sufficient to allow it to project equidistant beyond the vertical plane of the respective bracket arms 24. In this position bar 34 is on a horizontal plane with its longitudinal axis perpendicular to the direction of travel of the picker 10 and is designed to rotate on its central pivot in either of two directions as will later appear. Each projecting end portion of bar 34 is provided with a hole 36 to loosely receive a bent end of a rigid link such as a rod 38 that is similarly attached at its other end to a flange or ear 40 on one of the deflectors 20. Each deflector 20 as mentioned above is attached to one of the elevator sides by a hinge means 42 for lateral movement and therefore as bar 34 is pivoted or partially rotated, hoods 20 will simultaneously swing in response to the pull by rods 38 in the same direction to deflect the corn accordingly as it leaves end 18.

Means for moving or pivoting bar 34 is controlled by movement of the wagon 12 in the following manner. To the rear edge of bar 34 at its central portion a hinge means 44 carries a plate 46 that normally extends downwardly from its hinge point but can be swung upwardly as will later appear. A rod 48 having a stirrup-like end 50, has end 50 secured to the rear face of plate 46 by a bolt 52 which extends through plate 46 where a spring means 54 is held thereon against the forward face of plate 46 by a nut 56. A telescopic extension member 58 on the other end of rod 48 carries a hook or claw 60 for engagement with a flange or bracket 62 attached to the forward body portion of wagon 12. Thus, in a turn, as wagon 12 changes its relative tandem alignment with the picker 10, the members 48 and 50 will change correspondingly causing the deflectors 20 to swing laterally for directing the flow of corn into the wagon. In this operation it will be understood that bar 34 turns on its pivot point and to limit the turning of bar 34, I have provided the depending stops 64 from each bracket portion 26 which are engaged at times by the respective end portions of bar 34. If this limit is reached in a turn, spring 54 will still provide some yieldability to relieve unnecessary strain on plate 46 and hinge 44. In this respect it is pointed out that stops 64 depend near the leading or forward edge of portions 26 while the pivot point of bar 34 afforded by bolt 30 is near the trailing or rearward edge thereof in order to not unduly limit the movement of bar 34. A bracket or eye 66 is mounted to the underside of elevator 16 which is engaged by hook 60 when the pick does not have the wagon attached and hinge 44 allowed members 48 and 50 to be elevated for this purpose.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my directional deflector for a corn picker elevator without departing from the real spirit and purpose of my invention, and it is my intention to cover by my claims, any modified forms of structure or use of mechanical equivalents which may be reasonably included within their scope.

I claim:

1. In a device of the class described, an adjustable bracket designed for attachment to the underside of the elevator on a corn picker, a control bar pivotally secured at its center to the underside of said bracket, a pair of deflectors designed to be hingedly secured at respective opposite sides of the discharge end of the elevator, rigid links connecting each deflector respectively to respective ends of said control bar whereby movement of said control bar on its pivot point will correspondingly move said deflectors, a lengthwise extensible member yieldingly secured at one end to said control bar for moving the same and at its other end designed to be attached to a wagon pulled by the corn picker and actuated by the turning movement thereof.

2. In combination with the elevator on a corn picker, said elevator having a receiving and a discharge end, a bracket adjustable as to width detachably secured to the underside of said elevator intermediate its ends, a bar pivotally secured at its longitudinal center to the underside of said bracket so as to project therefrom in two opposite directions, a pair of deflectors hingedly secured at respective opposite sides of the discharge end of said elevator, a rod connecting each projecting bar portion respectively with the respective deflector on the corresponding side of said elevator whereby movement of said bar moves said deflectors simultaneously in the same direction, a plate hinged for vertical movement to said bar, a lengthwise adjustable member yieldably secured at one end to said plate, and a hook on the other end thereof.

3. A device as defined in claim 2 including a catch means on said elevator for supporting the hook on said lengthwise adjustable member at times.

4. A device as defined in claim 2 including a stop means on said bracket to limit the movement of said control bar.

References Cited in the file of this patent

UNITED STATES PATENTS

| | | |
|---|---|---|
| 1,306,462 | Bergerud | June 10, 1919 |
| 1,798,231 | Thiemann | Mar. 31, 1931 |
| 2,465,156 | Huddle | Mar. 22, 1949 |
| 2,608,310 | De Penning | Aug. 26, 1952 |
| 2,634,004 | Turek | Apr. 7, 1953 |